United States Patent
Masuda et al.

(10) Patent No.: US 8,878,388 B2
(45) Date of Patent: *Nov. 4, 2014

(54) MOTOR CONTROL DEVICE THAT DECREASES POWER CONSUMED BY CONTROL POWER SOURCE WHEN POWER FAILS

(71) Applicant: FANUC Corporation, Yamanashi (JP)

(72) Inventors: Naoki Masuda, Yamanashi (JP); Kiichi Inaba, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,796

(22) Filed: Jun. 24, 2013

(65) Prior Publication Data

US 2013/0342013 A1    Dec. 26, 2013

(30) Foreign Application Priority Data

Jun. 25, 2012    (JP) .................. 2012-142136

(51) Int. Cl.
*H02J 3/14*    (2006.01)
*H02M 1/10*    (2006.01)
*H02P 1/00*    (2006.01)
*H02J 9/00*    (2006.01)

(52) U.S. Cl.
CPC .. *H02J 9/005* (2013.01); *H02J 3/14* (2013.01); *H02P 1/00* (2013.01)
USPC ........ 307/29; 318/400.04; 318/479; 318/599; 318/602; 318/636

(58) Field of Classification Search
CPC ........................................... H02J 9/005
USPC ............................................. 307/29
See application file for complete search history.

(56) References Cited

U.S. PATENT DOCUMENTS

| | | | |
|---|---|---|---|
| 6,972,541 B2 * | 12/2005 | Matsushiro et al. | 318/801 |
| 7,019,483 B2 * | 3/2006 | Markert | 318/671 |
| 8,019,460 B2 * | 9/2011 | Akaiwa et al. | 700/177 |
| 8,531,149 B2 * | 9/2013 | Kataoka et al. | 318/569 |
| 8,698,442 B2 * | 4/2014 | Okita et al. | 318/566 |
| 2001/0035018 A1 * | 11/2001 | Takagi et al. | 62/228.4 |
| 2009/0102405 A1 * | 4/2009 | Hwang et al. | 318/400.15 |
| 2013/0154531 A1 * | 6/2013 | Furutani et al. | 318/400.26 |

FOREIGN PATENT DOCUMENTS

| | | |
|---|---|---|
| JP | 5-333969 A | 12/1993 |
| JP | 8-54914 A | 2/1996 |
| JP | 10-263973 A | 10/1998 |
| JP | 2002-218676 | 8/2002 |

(Continued)

*Primary Examiner* — Jared Fureman
*Assistant Examiner* — Toan Vu
(74) *Attorney, Agent, or Firm* — Drinker Biddle & Reath LLP

(57) ABSTRACT

A motor control device has a current value sampling unit configured to sample a current value of a motor, a PWM signal generation unit configured to generate a PWM signal to drive the motor, based on the sampled current value of the motor, and a power supply stop unit configured to stop supply of power from a control power supply to a peripheral depending on power stored in a DC link part and power to which the control power source can supply when an alternating-current power source fails.

8 Claims, 5 Drawing Sheets

(56) References Cited

FOREIGN PATENT DOCUMENTS

| JP | 2004-216829 A | 8/2004 |
|---|---|---|
| JP | 2007-185018 A | 7/2007 |
| JP | 2009-033920 | 2/2009 |
| JP | 2009-75799 | 4/2009 |
| JP | 2009-201180 | 9/2009 |
| JP | 2011-209936 A | 10/2011 |

* cited by examiner

US 8,878,388 B2

MOTOR CONTROL DEVICE THAT DECREASES POWER CONSUMED BY CONTROL POWER SOURCE WHEN POWER FAILS

RELATED APPLICATION DATA

This application claims priority under 35 U.S.C. §119 and/or §365 to Japanese Application No. 2012-142136 filed Jun. 25, 2012, the entire contents of which is incorporated herein by reference.

BACKGROUND OF THE INVENTION

1. Field of the Invention

The present invention relates to a motor control device to which power is supplied from a control power source configured to supply power to a peripheral of a motor in order to control the motor driven by power stored in a DC link part connected to an alternating-current power source via a converter.

2. Description of Related Art

A motor control device for controlling a motor in order to carry out at least one of an operation to retract a driven object connected to the motor to a region where the driven object does not interfere with an object and an operation to stop the motor in order to avoid interference of the driven object connected to the motor with the object when power fails in a machine, such a machine tool, in which it is necessary to carry out a synchronized operation of a work and a tool therein at all times, is proposed in, for example, Japanese Unexamined Patent Publication (Kokai) No. 8-54914 (JP8-54914A) and Japanese Unexamined Patent Publication (Kokai) No. 2011-209936 (JP2011-209936A).

However, there may be a case where it is not possible to secure power necessary for control by a motor control device to carry out at least one of the operation to retract a driven object connected to a motor to a region where the driven object does not interfere with an object and the operation to stop the motor in order to avoid interference of the driven object connected to the motor with the object.

On the other hand, a control device that secures power of a control device when power fails by an uninterruptible power source device is proposed in, for example, Japanese Unexamined Patent Publication (Kokai) No. 5-333969 (JP5-333969A). However, the uninterruptible power source device is expensive, and therefore, if the uninterruptible power source device is used in order to secure power of the control device when power fails, there is such a disadvantage that the system including the control device is expensive.

Further, a motor control device that uses a control power source having a smoothing capacitor in order to secure power of the motor control device when power fails without raising the cost of the system including the motor control device is proposed in, for example, Japanese Unexamined Patent Publication (Kokai) No. 10-263973 (JP10-263973A) and Japanese Unexamined Patent Publication (Kokai) No. 2004-216829 (JP2004-216829A).

However, power that the control power source having a smoothing capacitor can secure when power fails is smaller than power that the uninterruptible power source device can secure. Consequently, in the case where the control power source supplies power to a peripheral (motor cooling fan, monitor, etc.) of the motor in addition to the motor control device, there may be a case where it is not possible to secure power necessary for the control by the motor control device to carry out at least one of the operation to retract a driven object connected to the motor to a region where the driven object does not interfere with an object and the operation to stop the motor in order to avoid interference of the driven object connected to the motor with the object.

Further, as a motor control device using a control power source having a smoothing capacitor, a motor control device that lengthens the output hold time of the control power source by stopping supply of power to a peripheral of a motor in order to save parameters, operation values, etc. in a memory when power fails is proposed in, for example, Japanese Unexamined Patent Publication (Kokai) No. 2007-185018 (JP2007-185018A).

The conventional motor control device that lengthens the output hold time of the control power source when power fails in order to save parameters, operation values, etc., in a memory when power fails is configured to stop supply of power to the peripheral of the motor even if first power necessary to retract a driven object connected to the motor to a region where the driven object does not interfere with an object, or second power necessary to stop the motor in order to avoid interference of the driven object connected to the motor with the object, or the sum of the first power and the second power cannot be secured, and therefore, it is not possible to lengthen the output hold time of the control power source in order to make it possible to carry out at least one of the operation to retract the driven object connected to the motor to a region where the driven object does not interfere with the object and the operation to stop the motor in order to avoid interference of the driven object connected to the motor with the object.

SUMMARY OF THE INVENTION

As an aspect, the present invention provides a motor control device capable of lengthening the output hold time of a control power source in order to make it possible to carry out at least one of the operation to retract a driven object connected to a motor to a region where the driven object does not interfere with an object and the operation to stop the motor in order to avoid interference of the driven object connected to the motor with the object.

According to an aspect of the present invention, a motor control device to which power is supplied from a control power source configured to supply power to a peripheral of a motor in order to control the motor driven by power stored in a DC link part connected to an alternating-current power source via a converter, includes: a current value sampling unit configured to sample a current value of the motor; a PWM signal generation unit configured to generate a PWM signal to drive the motor, based on the sampled current value of the motor; and a power supply stop unit configured to stop supply of power from the control power source to the peripheral depending on the power stored in the DC link part and power to which the control power source can supply when the alternating-current power source fails.

Preferably, the power supply stop unit stops the supply of power from the control power supply to the peripheral if the power stored in the DC link part is larger than any one of first power necessary to retract an driven object connected to the motor to a region where the driven object does not interfere with an object, second power necessary to stop the motor in order to avoid interference of the driven object connected to the motor with the object, and the sum of the first power and the second power, and the power to which the control power source can supply is smaller than the sum of power necessary to drive the peripheral and power necessary to drive the motor control device when the alternating-current power source fails.

Preferably, the current value sampling unit increases a sampling period of the current value of the motor if the power stored in the DC link part is larger than any one of the first power, the second power, and the sum of the first power and the second power, and the power to which the control power source can supply is smaller than the power necessary to drive the motor control device when the alternating-current power source fails.

Preferably, the PWM signal generation unit increases a carrier frequency of the PWM signal if the power stored in the DC link part is larger than any one of the first power, the second power, and the sum of the first power and the second power, and the power to which the control power source can supply is smaller than the power necessary to drive the motor control device when the alternating-current power source fails.

Preferably, the motor control device further has a motor sampling unit configured to sample the position or speed of the motor, a driven object sampling unit configured to sample the position or speed of the driven object connected to the motor, and an operation stop unit configured to stop the operation of any one of the motor sampling unit and the driven object sampling unit if the power stored in the DC link part is larger than any one of the first power, the second power, and the sum of the first power and the second power, and the power to which the control power supply can supply is smaller than the power necessary to drive the motor control device when the alternating-current power source fails.

Preferably, the power supply stop unit stops the supply of power from the control power source to the peripheral if the power stored in the DC link part is equal to or less than first power necessary to retract the driven object connected to the motor to a region where the driven object does not interfere with the object and at the same time, is larger than second power necessary to stop another motor in order to avoid interference of a driven object connected to the other motor connected in parallel to the motor controlled by the motor control device with an object, the sum of the power stored in the DC link part and reduction energy stored in the DC link part while the other motor is coming to a stop is larger than the sum of the first power and the second power, and the power to which the control power source can supply is smaller than the sum of the power necessary to drive the peripheral and the power necessary to drive the motor control device and the motor control device of the other motor when the alternating-current power source fails.

Preferably, the current value sampling unit increases the sampling period of the current value of the motor if the power stored in the DC link part is equal to or less than the first power and at the same time, is larger than the second power, the sum of the power stored in the DC link part and the reduction energy generated while another motor is coming to a stop is larger than the sum of the first power and the second power, and the power to which the control power source can supply is smaller than the power necessary to drive the motor control device and the motor control device of the other motor when the alternating-current power source fails.

Preferably, the PWM signal generation unit increases the carrier frequency of the PWM signal if the power stored in the DC link part is equal to or less than the first power and at the same time, is larger than the second power, the sum of the power stored in the DC link part and the reduction energy generated while another motor is coming to a stop is larger than the sum of the first power and the second power, and the power that the control power source can supply is smaller than the power necessary to drive the motor control device and the motor control device of the other motor when the alternating-current power source fails.

Preferably, the motor control device further has a motor sampling unit configured to sample the position or speed of the motor, a driven object sampling unit configured to sample the position or speed of the driven object connected to the motor, and an operation stop unit configured to stop the operation of any one of the motor sampling unit and the driven object sampling unit if the power stored in the DC link part is equal to or less than the first power and at the same time, is larger than the second power, the sum of the power stored in the DC link part and the reduction energy generated while another motor is coming to a stop is larger than the sum of the first power and the second power, and the power to which the control power source can supply is smaller than the power necessary to drive the motor drive device and the motor control device of the other motor when the alternating-current power source fails.

According to the motor control device of an aspect of the present invention, it is possible to lengthen the output hold time of the control power source in order to make it possible to carry out at least one of the operation to retract the driven object connected to the motor to a region where the driven object does not interfere with the object and the operation to stop the motor in order to avoid interference of the driven object connected to the motor with the object.

BRIEF DESCRIPTION OF THE DRAWINGS

The objects, features, and advantages of the present invention will be clear based on the description in the following embodiments relating to the accompanying drawings. In the drawings.

DETAILED DESCRIPTION

Figure 1:
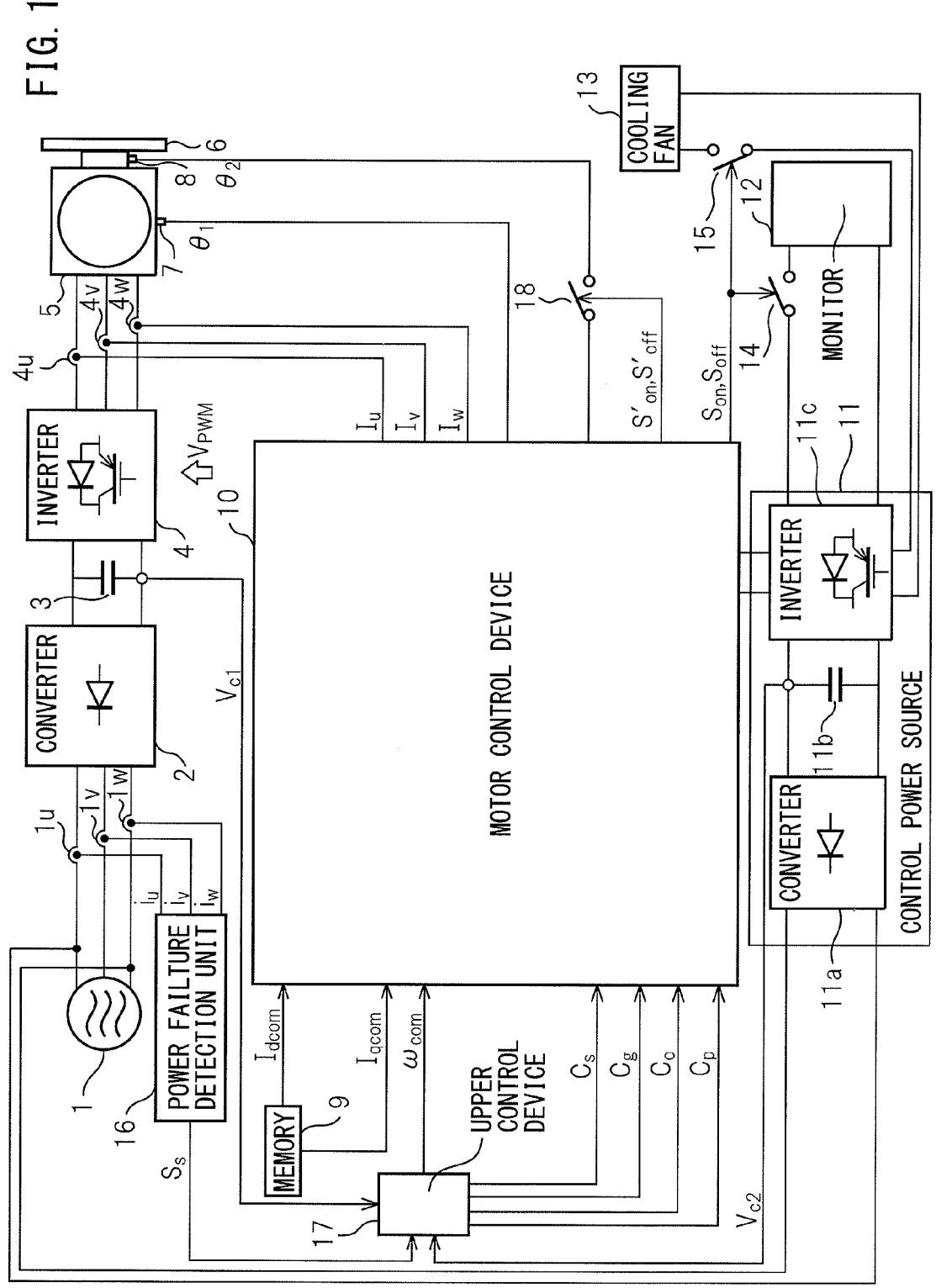
FIG. 1 is a block diagram of a system having a motor control device of an embodiment of the present invention.

Embodiments of the present invention are explained with reference to the drawings. In the drawings, the same symbols are attached to the same components.

Figure 2:
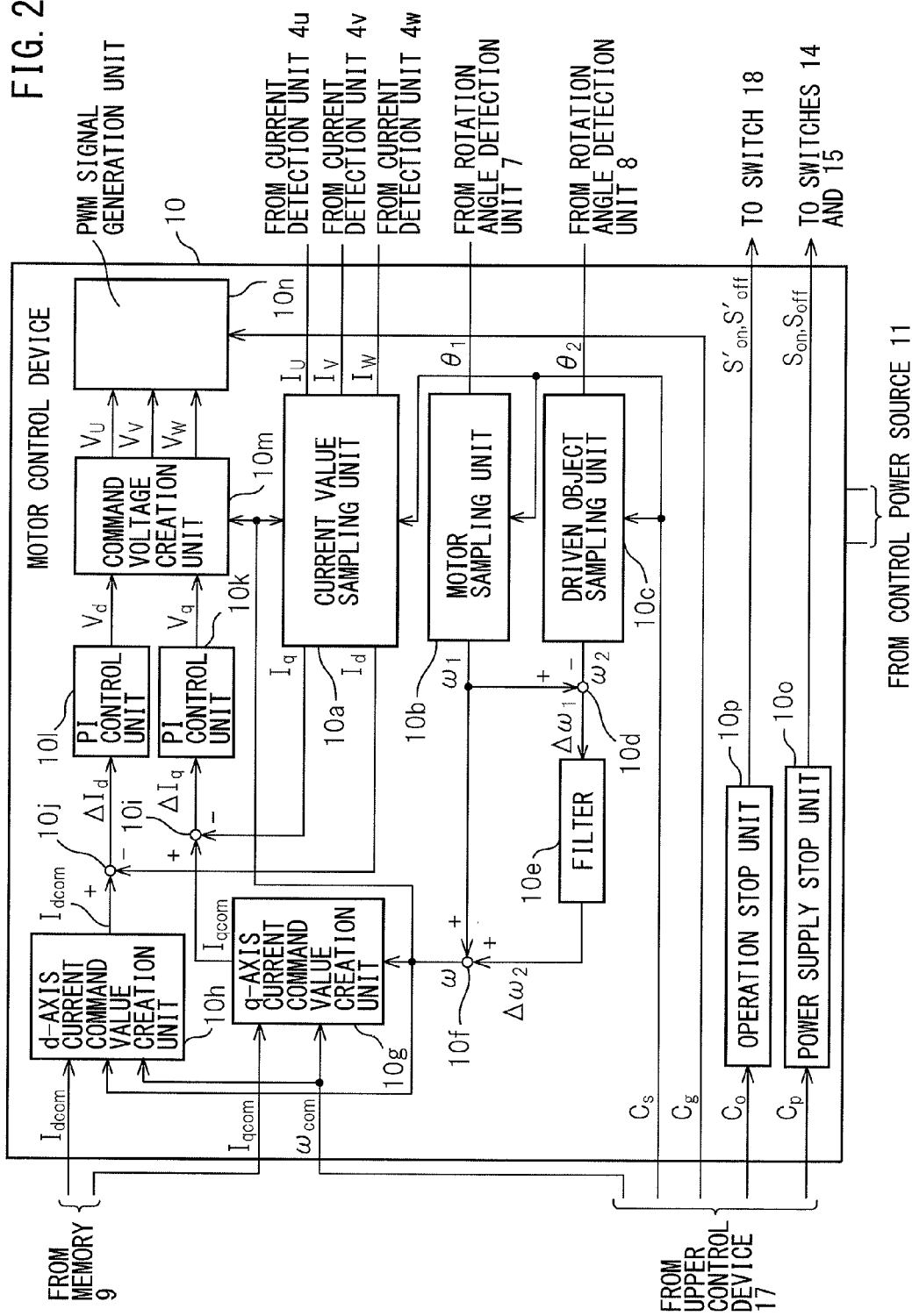
FIG. 2 is a block diagram of the motor control device in FIG. 1.

Referring to the drawings, FIG. 1 is a block diagram of a system having a motor control device of an embodiment of the present invention and FIG. 2 is a block diagram of the motor control device in FIG. 1. The system shown in FIG. 1 is used in a machine tool, in which it is necessary to carry out a synchronized operation of a work and a tool therein at all times. The system shown in FIG. 1 has a three-phase alternating-current power source 1 as an alternating-current power source, a converter 2, a smoothing capacitor 3 as a DC link part, an inverter 4, a motor 5, a driven object 6, rotation angle detection units 7 and 8, a memory 9, a motor control device 10, a control power source 11, a monitor 12 as a peripheral, a cooling fan 13 as the peripheral, switches 14 and 15, a power failure detection unit 16, an upper control device 17, and a switch 18.

The converter 2 consists of, for example, a plurality (six, in the case of three-phase alternating current) of rectifier diodes and converts alternating-current power supplied from the three-phase alternating-current power source 1 into direct-current power. The smoothing capacitor 3 is connected in parallel to the converter 2 in order to smooth a voltage rectified by the rectifier diode of the converter 2. The inverter 4 is connected in parallel to the smoothing capacitor 3, consists of, for example, a plurality (six, in the case of three-phase alternating current) of rectifier diodes and transistors connected in inverse parallel to the rectifier diodes, respectively, and converts the direct-current power into which converted by the converter 2 into alternating-current power by turning on and off the transistor based on a PWM signal $V_{PWM}$, to be explained later.

The motor 5 is driven by power stored in the smoothing capacitor 3. As the motor 5, a gravity axis servo motor configured to drive the main axis of a machine tool in the gravity axis direction (Z-axis direction) by a feed screw mechanism, such as a ball screw and nut mechanism, a main axis motor configured to drive a tool attached to the main axis of a machine tool, a horizontal axis serve motor configured to drive a table of a machine tool to which a work is attached in the horizontal direction (for example, X-axis direction) by a feed screw mechanism, such as a ball screw and nut mechanism, etc., is used.

The driven object 6 is, for example, the main axis of a machine tool in the case where the motor 5 is a gravity axis servo motor, or a tool in the case where the motor 5 is a main axis motor, or a table of a machine tool in the case where the motor 5 is a horizontal axis servo motor.

The rotation angle detection unit 7 consists of a rotary encoder configured to detect a rotation angle $\theta_1$ of the motor 5 as the position of the motor, and the rotation angle detection unit 8 consists of a rotary encoder configured to detect a rotation angle $\theta_2$ of the driven object 6 as the position of the driven object.

The memory 9 stores a lookup table indicating a relationship among a rotation speed command value $\omega_{com}$, which is a speed command value for the motor 5 to be input to the motor control device 10 from the upper control device 17, an actual rotation speed $\omega$ of the motor 5 corresponding to the position or speed of the motor 5, to be calculated as will be explained later, a q-axis current command value $I_{qcom}$, and a d-axis current command value $I_{dcom}$.

The motor control device 10 controls the motor 5 driven by power stored in the smoothing capacitor 3 connected to the three-phase alternating-current power source 1 via the converter 2. To do this, the motor control device 10 samples each of current values of three phases of a U-phase current $I_U$, a V-phase current $I_V$, and a W-phase current $I_W$ detected by current detection units 4u, 4v, and 4w provided in output lines of the inverter 4 as the current value of the motor 5, and samples each of the rotation angles $\theta_1$ and $\theta_2$ as the position or speed of the motor and the position or speed of the driven object. Then, the motor control device 10 generates the PWM signal $V_{PWM}$ to drive the motor 5, based on each of the sampled current values of the U-phase current $I_U$, the V-phase current $I_V$, and the W-phase current $I_W$, and the sampled rotation angles $\theta_1$ and $\theta_2$. The current detection units 4u, 4v, and 4w consist of, for example, hole elements. In order to control the motor 5, power is supplied from the control power source 11, which is configured to supply power to the monitor 12 and the cooling fan 13, to the motor control device 10.

Further, the motor control device 10 carries out the control to lengthen the output hold time of the control power source 11 in order to make it possible to carry out at least one of the operation to retract the driven object 6 (for example, tool) to a region where driven object 6 does not interfere with an object (for example, work attached to the table of the machine tool) and the operation to safely stop the motor 5 in order to avoid interference of the driven object 6 with the object (i.e., operation to stop motor 5 by reducing the rotation speed command value $\omega_{com}$ to zero in order to avoid interference of the driven object 6 with the object caused by the movement (for example, fall) of the motor 5) when the three-phase alternating-current power source 1 fails.

In order to carry out the control of the motor 5 and control to lengthen the output hold time of the control power source 11, the motor control device 10 has a current value sampling unit 10a, a motor sampling unit 10b, a driven object sampling unit 10c, a subtracter 10d, a filter 10e, an adder 10f, a q-axis current command value creation unit 10g, a d-axis current command value creation unit 10h, a subtracter 10i, a subtracter 10j, a PI control unit 10k, a PI control unit 101, a command voltage creation unit 10m, a PWM signal generation unit 10n, a power supply stop unit 10o, and an operation stop unit 10p.

The current value sampling unit 10a samples the current values of the three phases of the U-phase current $I_U$, the V-phase current $I_V$, and the W-phase current $I_W$ flowing through the motor 5 at each sampling period (control period of the motor control device 10) corresponding to a one clock period (for example, 250 microseconds) of a clock signal, which is output to each unit of the motor control device 10 by a clock (not shown schematically) incorporated in the motor control device 10, and detects a q-axis current $I_q$ and a d-axis current $I_d$, based on the three phases of the U-phase current $I_U$, the V-phase current $I_V$, and the W-phase current $I_W$ flowing through the motor 5 and a rotation angle $\theta$ corresponding to the actual rotation speed $\omega$ of the motor 5. To do this, the current value sampling unit 10a consists of a coordinate converter configured to perform rotation coordinate conversion and three-phase to two-phase conversion. Consequently, the current value sampling unit 10a converts the three phases of the U-phase current $I_U$, the V-phase current $I_V$, and the W-phase current $I_W$ in the stationary coordinate system (UVW coordinate system) into two phases of the q-axis current $I_q$ and the d-axis current $I_d$ expressed by the rotation coordinate system rotated by the rotation angle $\theta$ corresponding to the actual rotation speed $\omega$ with respect to the stationary coordinate system ($\alpha\beta$ coordinate system), and outputs the q-axis current $I_q$ and the d-axis current $I_d$ to the subtracter 10i and the subtracter 10j, respectively.

In this case, the three phases of the U-phase current $I_U$, the V-phase current $I_V$, and the W-phase current $I_W$ are detected by the current detection units 4u, 4v, and 4w provided in the output lines of the inverter 4 and current detection signals, which is output from the current detection units 4u, 4v, and 4w, are input to an A/D converter, not shown schematically, and converted into digital data. The current detection units 4u, 4v, and 4w are consist of, for example, hole elements.

In the motor control device 10 shown in FIG. 2, the current value sampling unit 10a increases the sampling period of the current values of the U-phase current $I_U$, the V-phase current $I_V$, and the W-phase current $I_W$ in such a manner as will be described later in detail if a sampling period increase command $C_s$, described later, is input from the upper control device 17.

The motor sampling unit 10b samples the rotation angle $\theta_1$ at each sampling period described above, and differentiates the rotation angle $\theta_1$ with respect to time to calculate a rotation speed $\omega_1$ of the motor 5 corresponding to the frequency of the U-phase current $I_U$, the V-phase current $I_V$, and the W-phase current $I_W$, and outputs the rotation speed $\omega_1$ to the subtracter 10*d* and the adder 10*f*.

In the motor control device 10 shown in FIG. 2, the motor sampling unit 10*b* increases the sampling period of the rotation angle $\theta_1$ in such a manner as will be explained later in detail if the above-mentioned sampling period increase command $C_s$ is input from the upper control device 17.

The driven object sampling unit 10*c* is provided to carry out full-closed control. To do this, the driven object sampling unit 10*c* samples the rotation angle $\theta_2$ at each sampling period described above, differentiates the rotation speed $\theta_2$ with respect to time to calculate a rotation speed $\chi_2$ of the driven object 6 corresponding to the frequency of the U-phase current $I_U$, the V-phase current $I_V$, and the W-phase current $I_W$, as the speed of the driven object 6, and outputs the rotation speed $\omega_2$ to the subtracter 10*d*.

In the motor control device 10 shown in FIG. 2, the driven object sampling unit 10*c* increases the sampling period in such a manner as will be explained later in detail if the above-mentioned sampling period increase command $C_s$ is input from the upper control device 17. Further, the driven object sampling unit 10*c* operates while the switch 18 is on and stops the operation thereof while the switch 18 is off.

The subtracter 10*d* has a non-inversion input part to which the rotation speed $\omega_1$ of the motor 5 is input, an inversion input part to which the rotation speed $\omega_2$ of the driven object 6 is input, and an output part configured to output a difference $\Delta\omega_1$, which is a result of subtraction between the rotation speed $\omega_1$ of the motor 5 and the rotation speed $\omega_2$ of the driven object 6, to the filter 10*e*. The filter 10*e* filters the difference $\Delta\omega_1$ and outputs the filtered difference $\Delta\omega_2$ to the adder 10*f*. The adder 10*f* has a first non-inversion input part to which the rotation speed $\omega_1$ of the motor 5 is input, a second non-inversion input part to which the filtered difference $\Delta\omega_2$ is input, and an output part configured to output the rotation speed $\omega$ of the motor, which is a result of addition of the rotation speed $\omega_1$ of the motor 5 and the filtered difference $\Delta\omega_2$, to the q-axis current command value creation unit 10*g* and the d-axis current command value creation unit 10*h*.

The q-axis current command value creation unit 10*g* creates the q-axis current command value $I_{qcom}$. To do this, the actual rotation speed $\omega$ of the motor 5 is input from the adder 10*f* to the q-axis current command value creation unit 10*g*, the rotation speed command value $\omega_{com}$ is input from the upper control device 17 to the q-axis current command value creation unit 10*g*, the q-axis current command value creation unit 10*g* reads the q-axis current command value $I_{qcom}$, which corresponds to the rotation speed command value $\omega_{com}$ and the actual rotation speed $\omega$ of the motor 5, from the memory 9, and the q-axis current command value creation unit 10*g* outputs the read q-axis current command value $I_{qcom}$ to the subtracter 10*i*.

The d-axis current command value creation unit 10*h* creates the d-axis current command value $I_{dcom}$. To do this, the actual rotation speed $\omega$ of the motor 5 is input from the adder 10*f* to the d-axis current command value creation unit 10*h*, the rotation speed command value $\omega_{com}$ is input from the upper control device 17 to the d-axis current command value creation unit 10*h*, the d-axis current command value creation unit 10*h* reads the d-axis current command value $I_{dcom}$, which corresponds to the rotation speed command value $\omega_{com}$ and the actual rotation speed $\omega$ of the motor 5, from the memory 9 and the d-axis current command value creation unit 10*h* outputs the read d-axis current command value $I_{dcom}$ to the subtracter 10*j*.

The subtracter 10*i* has a non-inversion input part to which the q-axis current command value $I_{qcom}$ is input, an inversion input part to which the q-axis current $I_q$ is input, and an output part configured to output a current deviation $\Delta I_q$, which is a result of subtraction between the q-axis current command value $I_{qcom}$ and the value of the q-axis current $I_q$. The subtracter 10*j* has a non-inversion input part to which the d-axis current command value $I_{dcom}$ is input, an inversion input part to which the d-axis current $I_d$ is input, and an output part configured to output a current deviation $\Delta I_d$, which is a result of subtraction between the d-axis current command value $I_{dcom}$ and the value of the d-axis current $I_d$.

The current deviation $\Delta I_q$ is input to the PI control unit 10*k*, the PI control unit 10*k* creates a q-axis voltage command value $V_q$ by making proportional integral calculation of the current deviation $\Delta I_q$, and the PI control unit 10*k* outputs the q-axis voltage command value $V_q$ to the command voltage creation unit 10*m*. The current deviation $\Delta I_d$ is input to the PI control unit 10*l*, the PI control unit 10*l* creates a d-axis voltage command value $V_d$ by making proportional integral calculation of the current deviation $\Delta I_d$, and the PI control unit 10*l* outputs the d-axis voltage command value $V_d$ to the command voltage creation unit 10*m*.

The command voltage creation unit 10*m* creates a U-phase voltage command value $V_U$, a V-phase voltage command value $V_V$, and a W-phase voltage command value $V_W$, based on the q-axis voltage command value $V_q$ and the d-axis voltage command value $V_d$. To do this, the command voltage creation unit 10*m* consists of a coordinate converter configured to perform rotation coordinate conversion and two-phase to three-phase conversion. Consequently, the command voltage creation unit 10*m* converts the two phases of the d-axis voltage command value $V_d$ and the q-axis voltage command value $V_q$ expressed by the rotation coordinate system rotated by the rotation angle $\theta$ corresponding to the actual rotation speed $\omega$ of the motor 5 with respect to the stationary coordinate system ($\alpha\beta$ coordinate system) into three phases of the U-phase voltage command value $V_U$, the V-phase voltage command value $V_V$, and the W-phase voltage command value $V_W$, and outputs the U-phase voltage command value $V_U$, the V-phase voltage command value $V_V$, and the W-phase voltage command value $V_W$ to the PWM signal generation unit 10*n*.

The PWM signal generation unit 10*n* generates the PWM signal $V_{PWM}$ (in this case, $V_{PWM1}$, $V_{PWM2}$, $V_{PWM3}$, $V_{PWM4}$, $V_{PWM5}$, and $V_{PWM6}$ corresponding to each transistor of the converter 4), based on the U-phase voltage command value $V_U$, the V-phase voltage command value $V_V$, and the W-phase voltage command value $V_W$, i.e., the sampled current values of the three phases of the U-phase current $I_U$, the V-phase current $I_V$, and the W-phase current $I_W$, and the sampled rotation angles $\theta_1$ and $\theta_2$, and outputs the PWM signal $V_{PWM}$ in order to drive the motor 5. To do this, the PWM signal generation unit 10*n* generates the PWM signal $V_{PWM}$, based on the carrier frequency corresponding to one period (for example, 250 microseconds) of a timer (not shown schematically) incorporated in the motor control device 10.

In the motor control device 10 shown in FIG. 2, the PWM signal generation unit 10*n* increases the carrier frequency in such a manner as will be explained later in detail if a carrier frequency increase command $C_g$, to be explained later, is input from the upper control device 17.

If a power supply stop command $C_p$, to be explained later, is input from the upper control device 17 to the power supply stop unit 10*o*, the power supply stop unit 10*o* supplies a switching signal $S_{off}$ to turn off the switches 14 and 15 to the switches 14 and 15, and if the power supply stop command $C_p$ is not input from the upper control unit 17 to the power supply stop unit 10*o* while the motor 5 is being driven, the power supply stop unit 10*o* supplies a switching signal $S_{on}$ to turn on the switches 14 and 15 to the switches 14 and 15.

If an operation stop command $C_o$, to be explained later, is input from the upper control device 17 to the operation stop unit 10*p*, the operation stop unit 10*p* supplies a switching signal $S_{off}'$ to turn off the switch 18 to the switch 18, and if the operation stop command $C_o$ is not input from the upper control device 17 to the operation stop unit 10*p* while the motor 5 is being driven, the operation stop unit 10*p* supplies a switching signal $S_{on}'$ to turn on the switch 18 to the switch 18.

The control power source 11 supplies power to the motor control device 10, the monitor 12, and the cooling fan 13. To do this, the control power source 11 has a converter 11*a*, a smoothing capacitor 11*b*, and an inverter 11*c*.

The converter 11*a* consists of, for example, a plurality (two, in this case) of rectifier diodes and converts alternating-current power supplied from the three-phase alternating-current power source 1 into direct-current power. The smoothing capacitor 11*b* has a capacitance smaller than the capacitance of the smoothing capacitor 3 and is connected in parallel to the converter 11*a* in order to smooth a voltage rectified by the rectifier diode of the converter 11*a*. The inverter 11*c* is connected in parallel to the smoothing capacitor 11*b* and consists of, for example, a plurality (two, in this case) of rectifier diodes and transistors connected in inverse parallel to the rectifier diodes, respectively, and converts the direct-current power into which converted by the converter 11*a* into alternating-current power by turning on and off the transistors.

The monitor 12 displays various kinds of information, and power is supplied from the control power source 11 to the monitor 12. The cooling fan 13 cools down the motor 5 and the motor control device 10, and power is supplied from the control power source 11 to the cooling fan 13. The switch 14 turns on in response to the switching signal $S_{on}$ from the power supply stop unit 10*o* in order to supply power from the control power source 11 to the monitor 12, and turns off in response to the switching signal $S_{off}$ from the power supply stop unit 10*o* in order to stop the supply of power from the control power source 11 to the monitor 12. The switch 15 turns on in response to the switching signal $S_{on}$ from the power supply stop unit 10*o* in order to supply power from the control power source 11 to the cooling fan 13, and turns off in response to the switching signal $S_{off}$ from the power supply stop unit 10*o* in order to stop the supply of power from the control power source 11 to the cooling fan 13.

The power failure detection unit 16 detects a power failure of the three-phase alternating-current power source 1. To do this, the power failure detection unit 16 has a rectifier circuit (not shown schematically) having a plurality (six, in the case of three-phase alternating current) of rectifier diodes configured to rectify three phases of a U-phase current $i_U$, a V-phase current $i_V$, and a W-phase current $i_W$ detected by current detection units 1*u*, 1*v*, and 1*w* provided in the output lines of the three-phase alternating-current power source 1, and a comparator (not shown schematically) configured to compare the level of an output signal from the rectifier circuit and the reference level and to output a power failure detection signal $S_s$ to the upper control device 17 if the level of the output signal is lower than the reference level. The current detection units 1*u*, 1*v*, and 1*w* consist of, for example, hole elements.

In the system shown in FIG. 1, the memory 9, the motor control device 10, and the power failure detection unit 16 are implemented by a processor including an input/output port, a serial communication circuit, an A/D converter, a comparator, etc., and processing, to be explained later, is performed in accordance with processing programs stored in a memory, not shown schematically.

The upper control device 17 consists of a CNC (computer numerical control), etc., and inputs the rotation speed command value $\omega_{com}$ to the q-axis current command value creation unit 10*g* and the d-axis current command value creation unit 10*h* in order to control the motor control device 10. Further, when the power failure detection signal $S_s$ is input, the upper control device 17 detects a voltage (DC link voltage) $V_{c1}$ of the smoothing capacitor 3 and a voltage $V_{c2}$ of the smoothing capacitor 11*b*. Then, the upper control device 17 calculates motor power source suppliable power $P_m$ stored in the smoothing capacitor 3 and power stored in the smoothing capacitor 11*b*, i.e., control power source suppliable power $P_c$ to which the control power source 11 can supply when the alternating-current power source 1 fails, respectively, based on the detected voltage $V_{c1}$ and the voltage $V_{c2}$.

The switch 18 turns on in response to the switching signal $S_{on}'$ from the operation stop unit 10*p* in order to supply the rotation angle $\theta_2$ from the rotation angle detection unit 8 to the driven object sampling unit 10*c*, and turns off in response to the switching signal $S_{off}'$ from the operation stop unit 10*p* in order to stop the supply of the rotation angle $\theta_2$ from the rotation angle detection unit 8 to the driven object sampling unit 10*c*.

In the system shown in FIG. 1, motor drive power $P_{sr}$ corresponding to any one of the first power necessary to retract the driven object 6 to a region where the driven object 6 does not interfere with an object, the second power necessary to stop the motor 5 in order to avoid interference of the driven object 6 with an object when the alternating-current power source 1 fails, and the sum of the first power and the second power is stored in association with the rotation speed command value $\omega_{com}$ in a memory (not shown schematically) of the upper control device 17 in advance. Further, peripheral drive power $P_{mf}$ necessary to drive the monitor 12 and the cooling fan 13 when the alternating-current power source 1 fails is stored in the memory (not shown schematically) of the upper control device 17 in advance. Furthermore, first motor control device drive power $P_{mc1}$ necessary to drive the motor control device 10 when the alternating-current power source 1 fails, second motor control device drive power $P_{mc2}$ necessary to drive the motor control device 10 at the time of increasing the above-mentioned sampling period when the alternating-current power source 1 fails, and third motor control device drive power $P_{mc3}$ necessary to drive the motor control device 10 at the time of increasing the sampling period and the carrier frequency when the alternating-current power source 1 fails are stored in association with the rotation speed command value $\omega_{com}$ in the memory (not shown schematically) of the upper control device 17 in advance.

If the motor power source suppliable power $P_m$ is larger than the motor drive power $P_{sr}$ and the control power source suppliable power $P_c$ is smaller than the sum of the peripheral drive power $P_{mf}$ and the first motor control device drive power $P_{mc1}$ when the upper control device 17 receives the power failure detection signal $S_s$, the upper control device 17 outputs the power supply stop command $C_p$ to stop the supply of power from the control power source 11 to the monitor 12 and the cooling fan 13 to the power supply stop unit 10*o*.

If the motor power source suppliable power $P_m$ is larger than the motor drive power $P_{sr}$ and the control power source suppliable power $P_c$ is smaller than the first motor control device drive power $P_{mc1}$ when the upper control device 17 receives the power failure detection signal $S_s$, the upper control device 17 outputs the sampling period increase command $C_s$ to increase the above-mentioned sampling period (for example, to double the sampling period) to the current value sampling unit 10a, the motor sampling unit 10b, and the drive object sampling unit 10c, respectively.

If the motor power source suppliable power $P_m$ is larger than the motor drive power $P_{sr}$ and the control power source suppliable power $P_c$ is smaller than the second motor control device drive power $P_{mc2}$ when the upper control device 17 receives the power failure detection signal $S_s$, the upper control device 17 outputs the carrier frequency increase command $C_g$ to increase the above-mentioned carrier frequency (for example, to double the carrier frequency) to the PWM signal generation unit 10n.

If the motor power source suppliable power $P_m$ is larger than the motor drive power $P_{sr}$ and the control power source suppliable power $P_c$ is smaller than the third motor control device drive power $P_{mc3}$ when the upper control device 17 receives the power failure detection signal $S_s$, the upper control device 17 outputs the operation stop command $C_o$ to stop the operation of the driven object sampling unit 10c to the operation stop unit 10p.

Figure 3:
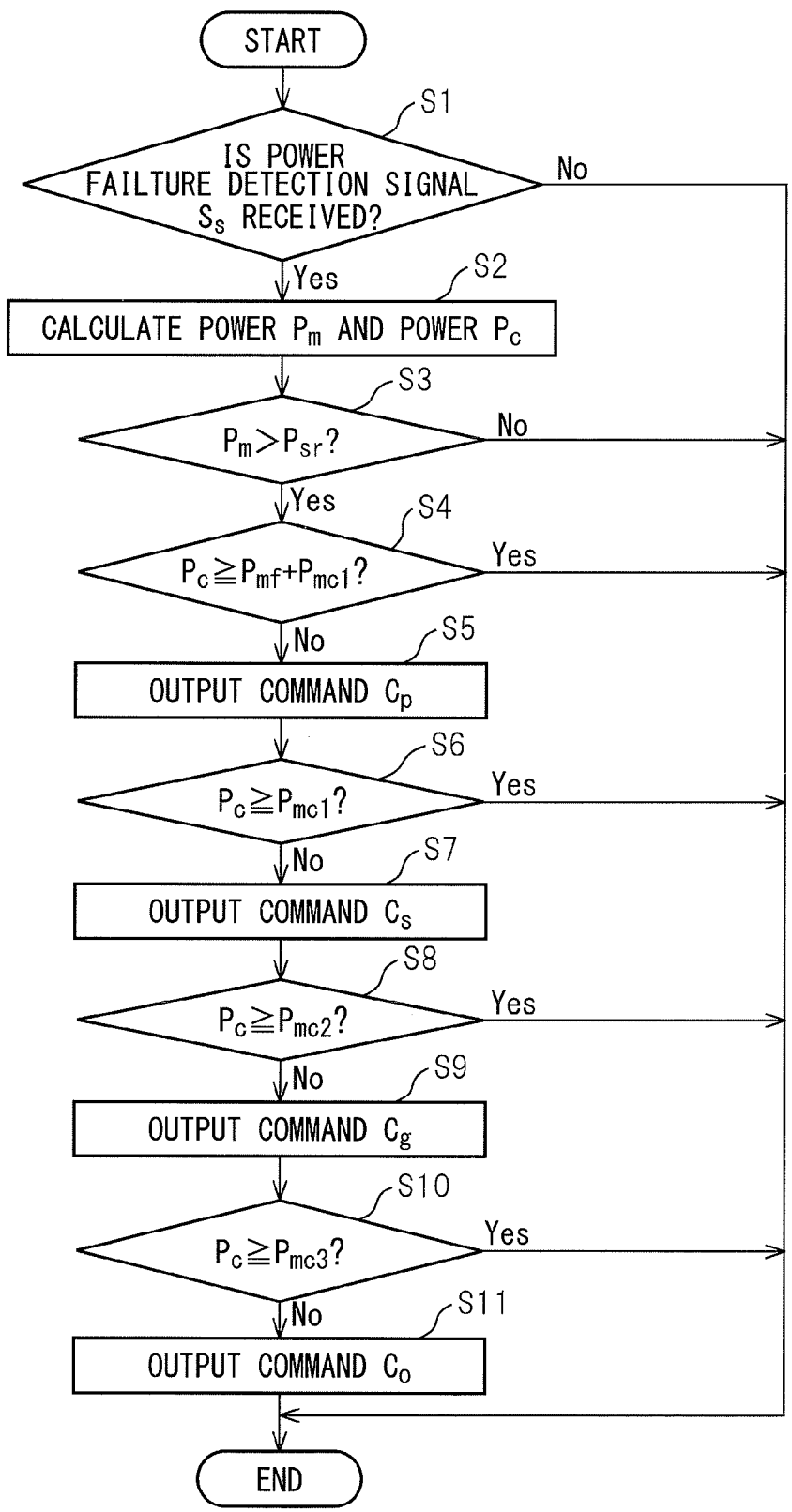
FIG. 3 is a flowchart of an operation of an upper control device in FIG. 1.

FIG. 3 is a flowchart of the operation of the upper control device in FIG. 1, which is performed at each control period (for example, 250 microseconds) during the period from the start of the drive of the motor 5 to the end of the drive of the motor 5 or the detection of the power failure of the three-phase alternating-current power source 1, and is controlled by the processing program executed in the upper control device 17.

First, the upper control device 17 determines whether or not it receives the power failure detection signal $S_s$ (step S1). If the upper control device 17 does not receive the power failure detection signal $S_s$, the processing flow is exited. In contrast, if the upper control device 17 receives the power failure detection signal $S_s$, the upper control device 17 calculates the motor power source suppliable power $P_m$ and the control power source suppliable power $P_c$ (step S2).

After step S2 is completed, the upper control device 17 determines whether or not the motor power source suppliable power $P_m$ is larger than the motor drive power $P_{sr}$ (step S3). If the motor power source suppliable power $P_m$ is equal to or less than the motor drive power $P_{sr}$, the processing flow is exited. In contrast, if the motor power source suppliable power $P_m$ is larger than the motor drive power $P_{sr}$, the upper control device 17 determines whether or not the control power source suppliable power $P_c$ is equal to or more than the sum of the peripheral drive power $P_{mf}$ and the first motor control device drive power $P_{mc1}$ (step S4).

If the control power source suppliable power $P_c$ is equal to or more than the sum of the peripheral drive power $P_{mf}$ and the first motor control device drive power $P_{mc1}$, the processing flow is exited. In contrast, if the control power source suppliable power $P_c$ is smaller than the sum of the peripheral drive power $P_{mf}$ and the first motor control device drive power $P_{mc1}$, the upper control device 17 outputs the power supply stop command $C_p$ to the power supply stop unit 10o (step S5).

After step S5 is completed, the upper control device 17 determines whether or not the control power source suppliable power $P_c$ is equal to or more than the first motor control device drive power $P_{mc1}$ (step S6). If the control power source suppliable power $P_c$ is equal to or more than the first motor control device drive power $P_{mc1}$, the processing flow is exited. In contrast, if the control power source suppliable power $P_c$ is smaller than the first motor control device drive power $P_{mc1}$, the upper control device 17 outputs the sampling period increase command $C_s$ to the current value sampling unit 10a, the motor sampling unit 10b, and the driven object sampling unit 10c, respectively (step S7).

If the sampling period increase command $C_s$ is input from the upper control device 17 to the current value sampling unit 10a, the motor sampling unit 10b and the driven object sampling unit 10c, they perform sampling processing each time they receive the clock signal twice, which is output from a clock (not shown schematically) incorporated in the motor control device 10. Consequently, the current value sampling unit 10a, the motor sampling unit 10b, and the driven object sampling unit 10c each perform the sampling processing at each sampling period (control period of the motor control device 10) corresponding to the two clock periods (for example, 500 microseconds). That is, the sampling period of the current value sampling unit 10a, the motor sampling unit 10b and the driven object sampling unit 10c increase to a sampling period twice that before the sampling period increase command $C_s$ is input.

The control period of the motor control device 10 corresponding to the sampling period of the current value sampling unit 10a, the motor sampling unit 10b and the driven object sampling unit 10c consists of a processing period of time during which each unit of the motor control device 10 performs processing and a rest period of time during which each unit of the motor control device 10 is at rest. The processing period of time is constant regardless of the length of the control period of the motor control device 10, and the power consumed by the motor control device 10 during the processing period of time is larger than the power consumed by the motor control device 10 during the rest period of time. Consequently, the power consumed by the motor control device 10 decreases as the ratio of the processing period of time to the length of the control period of the motor control device 10 decreases. According to the present embodiment, by increasing the sampling period of the current value sampling unit 10a, the motor sampling unit 10b, and the driven object sampling unit 10c, the ratio of the processing period of time to the length of the control period of the motor control device 10 decreases, and therefore, it is possible to decrease the power consumed by the motor control device 10.

After step S7 is completed, the upper control device 17 determines whether or not the control power source suppliable power $P_c$ is equal to or more than the second motor control device drive power $P_{mc2}$ (step S8). If the control power source suppliable power $P_c$ is equal to or more than the second motor control device drive power $P_{mc2}$, the processing flow is exited. In contrast, if the control power source suppliable power $P_c$ is smaller than the second motor control device drive power $P_{mc2}$, the upper control device 17 outputs the carrier frequency increase command $C_g$ to the PWM signal generation unit 10n (step S9).

If the carrier frequency increase command $C_g$ is input from the upper control device 17 to the PWM signal generation unit 10n, the PWM signal generation unit 10n sets a carrier frequency corresponding to two periods (for example, 500 microseconds) of a timer (not shown schematically) incorporated in the motor control device 10, and generates the PWM signal $V_{PWM}$ based the set carrier frequency. Consequently, the carrier frequency increases to a carrier frequency twice that before the carrier frequency increase command $C_g$ is input.

The number of times the PWM signal $V_{PWM}$ is generated per unit time (for example, one second) decreases as the carrier frequency increases, and the power necessary for the PWM signal generation unit 10n to generate the PWM signal $V_{PWM}$ decreases as the number of times the PWM signal $V_{PWM}$ is generated per unit time (for example, one second) decreases. According to the present embodiment, by increasing the carrier frequency, the number of times the PWM signal $V_{PWM}$ is generated per unit time (for example, one second) decreases, and therefore, it is possible to decrease the power consumed by the motor control device 10.

After step S9 is completed, the upper control device 17 determines whether or not the control power source suppliable power $P_c$ is equal to or more than the third motor control device drive power $P_{mc3}$ (step S10). If the control power source suppliable power $P_c$ is equal to or more than the third motor control device drive power $P_{mc3}$, the processing flow is exited. In contrast, if the control power source suppliable power $P_c$ is smaller than the third motor control device drive power $P_{mc3}$, the upper control device 17 outputs the operation stop command $C_o$ to the operation stop unit 10$p$ (step S11) and exits the processing flow.

If the operation stop command $C_o$ is input from the upper control device 17 to the operation stop unit 10$p$, the operation stop unit 10$p$ supplies the switching signal $S_{off}'$ to the switch 18. Consequently, the driven object sampling unit 10*c* stops the operation thereof and power is no longer consumed by the driven object sampling unit 10*c*, and therefore, it is possible to decrease the power consumed by the motor control device 10.

In the case where the motor 5 is a gravity axis servo motor, the motor control device 10 carries out the control of the motor 5 to retract the driven object 6 to a region where the driven object 6 does not interfere with an object and to stop the motor 5 in order to avoid interference of the driven object 6 with an object when the processing flow in FIG. 3 of the upper control device 17 is exited. In the case where the motor 5 is a horizontal axis servo motor, the motor control device 10 carries out the control of the motor 5 to retract the driven object to a region where the driven object 6 does not interfere with an object when the processing flow in FIG. 3 of the upper control device 17 is exited. In the case where the motor 5 is a main axis motor, the motor control device 10 carries out the control of the motor 5 to stop the motor 5 in order to avoid interference of the driven object 6 with an object when the processing flow in FIG. 3 of the upper control device 17 is exited.

According to the system shown in FIG. 1, the supply of power from the control power source 11 to the monitor 11 and the cooling fan 13 is stopped if the motor power source suppliable power $P_m$ is larger than the motor drive power $P_s$, and the control power source suppliable power $P_c$ is smaller than the sum of the peripheral drive power $P_{mf}$ and the first motor control device drive power $P_{mc1}$ when the three-phase alternating-current power source 1 fails, and therefore, it is possible to decrease the power consumed by the motor control device 10. Consequently, it is possible to lengthen the output hold time of the control power source 11 without increasing the capacitance of the smoothing capacitor 11$b$ in order to make it possible to carry out at least one of the operation to retract the driven object 6 to a region where the driven object 6 does not interfere with an object and the operation to stop the motor 5 in order to avoid interference of the driven object 6 with an object when the three-phase alternating-current power source 1 fails.

Further, if the motor power source suppliable power $P_m$ is larger than the motor drive power $P_{sr}$ and the control power source suppliable power $P_c$ is smaller than the first motor control device drive power $P_{mc1}$, the second motor control device drive power $P_{mc2}$ or the third motor control device drive power $P_{mc3}$ when the three-phase alternating-current power source 1 fails, it is possible to further decrease the power consumed by the motor control device 10 by increasing the sampling period of the current value sampling unit 10*a*, the motor sampling unit 10*b*, and the driven object sampling unit 10*c*, by increasing both the sampling period of the current value sampling unit 10*a*, the motor sampling unit 10*b* and the driven object sampling unit 10*c* and the carrier frequency of the PWM signal $V_{PWM}$, or by stopping the operation of the driven object sampling unit 10*c*.

Figure 4:
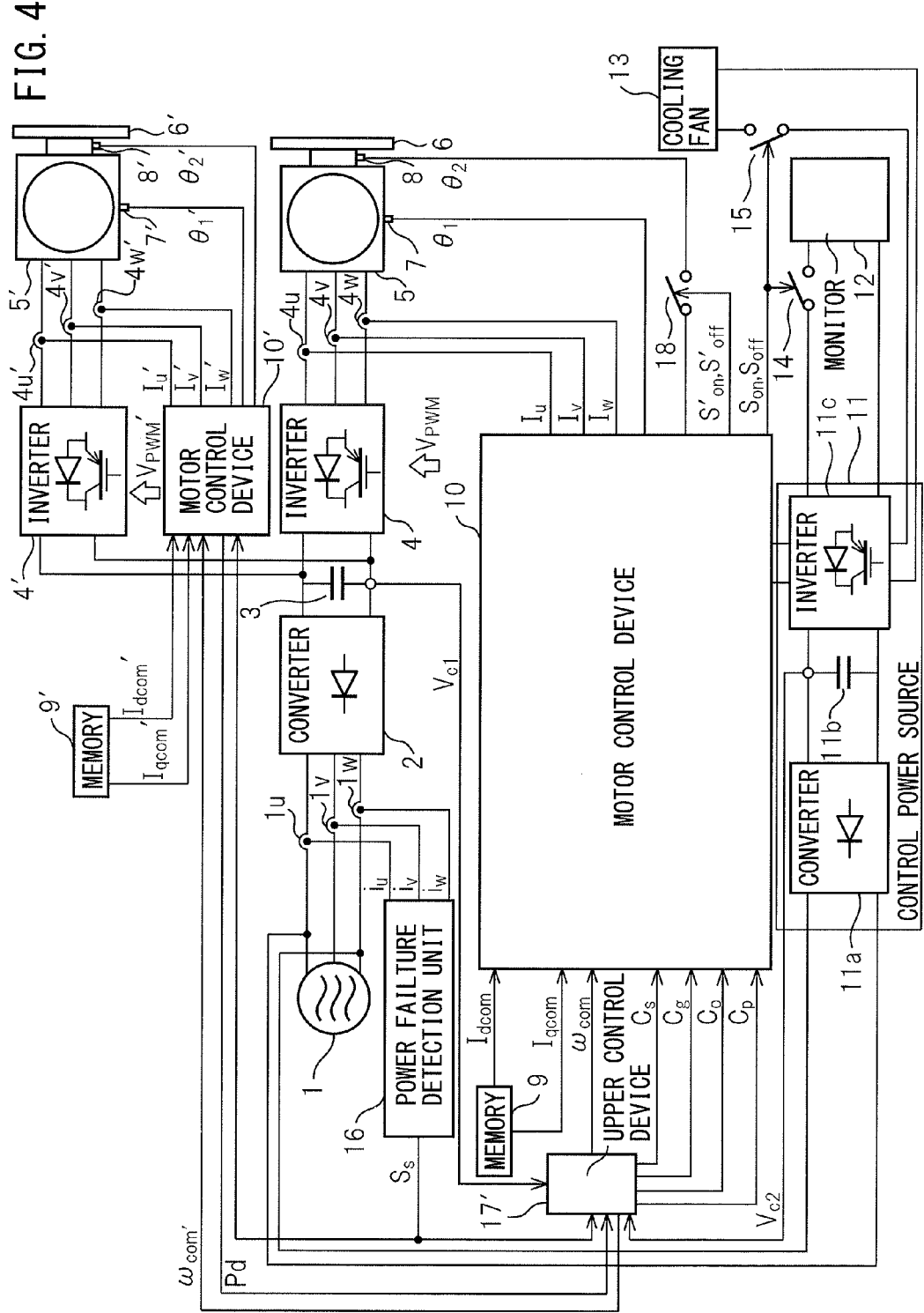
FIG. 4 is a block diagram of another system having the motor control device according to an embodiment of the present invention.

FIG. 4 is a block diagram of another system having the motor control device according to the embodiment of the present invention. The system shown in FIG. 4 is used in a machine tool, in which it is necessary to carry out a synchronized operation of a work and a tool therein at all times. The system shown in FIG. 4 has an upper control device 17' in place of the upper control device 17 in FIG. 1 and, in addition to the components of the system shown in FIG. 1 other than the upper control device 17, the system has an inverter 4', a motor 5', a driven object 6', rotation angle detection units 7' and 8', a memory 9', and a motor control device 10'.

The inverter 4' is connected in parallel to the smoothing capacitor 3 and the motor 5 and consists, for example, of a plurality (six, in the case of three-phase alternating current) of rectifier diodes and transistors connected in inverse parallel to the rectifier diodes, respectively, and converts the direct-current power into which converted by the converter 2 into alternating-current power by turning on and off the transistors based on a PWM signal $V_{PWM}'$, to be explained later.

The motor 5' is driven by power stored in the smoothing capacitor 3. In the system shown in FIG. 4, as the motor 5, for example, a first horizontal axis servo motor configured to drive a table of a machine tool to which a work is attached in a first horizontal direction (for example, X-axis direction) by a feed screw mechanism, such as a ball screw and nut mechanism, is used, and as the motor 5', for example, a second horizontal axis servo motor configured to drive a table of a machine tool to which a work is attached in a second horizontal direction (for example, Y-axis direction) orthogonal to the first horizontal direction by a feed screw mechanism, such as a ball screw and nut mechanism, is used.

The driven object 6 and the driven object 6' are, for example, tables of the same machine tool in the case where the motors 5 and 5' are the first horizontal axis servo motor and the second horizontal axis servo motor, respectively.

The rotation angle detection unit 7' consists of a rotary encoder configured to detect a rotation angle $\theta_1'$ of the motor 5' as the position of the motor, and the rotation angle detection unit 8' consists of a rotary encoder configured to detect a rotation angle $\theta_2'$ of the driven object 6' as the position of the driven object.

The memory 9' stores a lookup table indicating a relationship among a rotation speed command value $\omega_{com}'$, which is a speed command value for the motor 5' to be input from the upper control device 17' to the motor control device 10', an actual rotation speed $\omega'$ of the motor 5' corresponding to the position or speed of the motor 5', which is calculated in the same manner as the actual rotation speed $\omega$ of the motor 5, a q-axis current command value $I_{qcom}'$, and a d-axis current command value $I_{dcom}'$.

The motor control device 10' controls the motor 5' driven by power stored in the smoothing capacitor 3 connected to the three-phase alternating-current power source 1 via the converter 2. To do this, the motor control device 10' samples each current value of three phases of a U-phase current $I_U'$, a V-phase current $I_V'$, and a W-phase current $I_W'$ detected by current detection units 4*u'*, 4*v'*, and 4*w'* provided in the output lines of the inverter 4' as a current value of the motor, and samples the rotation angles $\theta_1'$ and $\theta_2'$ as the position or speed of the motor and as the position or speed of the driven object, respectively. Then, the motor control device 10' generates the PWM signal $V_{PWM}'$ to drive the motor 5' based on each of the sampled current values of the U-phase current $I_U'$, the V-phase current $I_V'$, and the W-phase current $I_W'$ and the sampled rotation angles $\theta_1'$ and $\theta_2'$. The current detection units $4u'$, $4v'$, and $4w'$ consist of, for example, hole elements. Although power is supplied from the control power source 11 to the motor control device 10', the path through which power is supplied from the control power source 11 to the motor control device 10' is omitted in FIG. 4 for simplification. Further, the motor control device 10' carries out control to stop the motor 5' when the power failure detection signal $S_s$ is input from the power failure detection unit 16 to the motor control device 10' and calculates reduction energy $P_d$ stored in the smoothing capacitor while the motor 5' is coming to a stop, based on the actual rotation speed $\omega'$ of the motor 5'. The speed reduction energy $P_d$ is larger than a stop operation power $P_{sr2}$, to be explained later. Then, the motor control device 10' provides information of the calculated reduction energy $P_d$ to the upper control device 17'.

In the system shown in FIG. 4, the memory 9' and the motor control device 10' are implemented by a processor including an input/output port, a serial communication circuit, an A/D converter, a comparator, etc., and processing to control the motor 5' is performed in accordance with processing programs stored in a memory, not shown schematically.

In the system shown in FIG. 4, as will be explained later, the motor control device 10 retracts the driven objects 6 and 6' to a region where the driven objects 6 and 6' do not interfere with an object when the three-phase alternating-current power source 1 fails and the motor control device 10' stops the motor 5' when the three-phase alternating-current power source 1 fails.

To do this, if the motor power source suppliable power $P_m$ is equal to or less than retract operation power $P_{sr1}$ as the first power necessary to retract the driven object 6 and at the same time, is larger than the stop operation power $P_{sr2}$ as the second power necessary to stop the motor 5', the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the sum of the peripheral drive power $P_{mf}$ and first motor control device drive power $P_{mc1}'$, to be explained later, when the three-phase alternating-current power source 1 fails, the power source supply stop unit $10o$ in the motor control device 10 carries out control to stop the supply of power from the control power source 11 to the monitor 12 and the cooling fan 13 to lengthen the output hold time of the control power source 11 by supplying the switching signal $S_{off}$ to turn off the switches 14 and 15 to the switches 14 and 15.

The upper control device 17' consists of a CNC (computer numerical control), etc., inputs the rotation speed command value $\omega_{com}$ to control the motor control device 10 to the q-axis current command value creation unit $10g$ and the d-axis current command value creation unit $10h$ in the motor control device 10, and inputs the rotation speed command value $\omega_{com}'$ to control the motor control device 10' to a q-axis current command value creation unit and a d-axis current command value creation unit (neither is shown schematically) in the motor control device 10'. Further, the upper control device 17' detects the voltage (DC link voltage) $V_{c1}$ of the smoothing capacitor 3 and the voltage $V_{c2}$ of the smoothing capacitor $11b$ when the power failure detection signal $S_s$ is input. Then, the upper control device 17' calculates the motor power source suppliable power $P_m$ stored in the smoothing capacitor 3 and the power stored in the smoothing capacitor $11b$, i.e., the control power source suppliable power $P_c$ to which the control power source 11 can supply when the alternating-current power source 1 fails, respectively, based on the detected voltage $V_{c1}$ and the voltage $V_{c2}$. Further, it may also be possible to establish serial communication between the motor control device 10, the motor control device 10', and the upper control device 17'.

In the system shown in FIG. 4, the retract operation power $P_{sr1}$ is stored in association with the rotation speed command value $\omega_{com}$ in a memory (not shown schematically) of the upper control device 17' in advance, and the stop operation power $P_{sr2}$ is stored in association with the rotation speed command value $\omega_{com}'$ in a memory (not shown schematically) of the upper control device 17' in advance. Further, the peripheral drive power $P_{mf}$ necessary to drive the monitor 12 and the cooling fan 13 when the alternating-current power source 1 fails is stored in the memory (not shown schematically) of the upper control device 17' in advance. Furthermore, the first motor control device drive power $P_{mc1}'$ necessary to drive the motor control devices 10 and 10' when the alternating-current power source 1 fails, second motor control device drive power $P_{mc2}'$ necessary to drive the motor control devices 10 and 10' at the time of increasing the above-mentioned sampling period when the alternating-current power source 1 fails, and third motor control device drive power $P_{mc3}'$ necessary to drive the motor control devices 10 and 10' at the time of increasing the sampling period and the above-mentioned carrier frequency when the alternating-current power source 1 fails, are stored in association with the rotation speed command value $\omega_{com}$ in the memory (not shown schematically) of the upper control device 17' in advance.

For example, in the case where the motors 5 and 5' are the first horizontal axis servo motor and the second horizontal axis servo motor, respectively, and the driven object 6 and the driven object 6' are the tables of the same machine tool, the upper control device 17' determines whether or not the motors 5 and 5' should be stopped in order to retract the driven objects 6 and 6' to a region where the driven objects 6 and 6' do not interfere with an object when the alternating-current power source 1 fails, based on the rotation speed command values $\omega_{com}$ and $\omega_{com}'$.

For example, if the upper control device 17' determines that the driven objects 6 and 6' should be moved in the first horizontal direction (for example, X-axis direction) in order to carry out the retract operation but the driven objects 6 and 6' do not have to be moved in the second horizontal direction (for example, Y-axis direction), the upper control device 17' controls the motor control device 10 so as to drive the motor 5 to retract the driven objects 6 and 6', and controls the motor control device 10' so as to stop the motor 5'.

Further, if the motor power source suppliable power $P_m$ is larger than the retract operation power $P_{sr1}$ and the control power source suppliable power $P_c$ is smaller than the sum of the peripheral drive power $P_{mf}$ and the first motor control device drive power $P_{mc1}$ when the upper control device 17' receives the power failure detection signal $S_s$, the upper control device 17' outputs the power supply stop command $C_p$ to the power supply stop unit $10o$.

If the motor power source suppliable power $P_m$ is equal to or less than the retract operation power $P_{sr1}$ and at the same time, is larger than the stop operation power $P_{sr2}$, the sum of the motor power source suppliable power $P_m$ and the reduction energy $P_d$ is larger than the sum of the retract operation power $_{sr1}$ and the stop operation power $P_{sr2}$, and the control power source suppliable power $P_c$ is smaller than the sum of the peripheral drive power $P_{mf}$ and the first motor control device drive power $P_{mc1}$ when the upper control device 17' receives the power failure detection signal $S_s$, the upper control device 17' also outputs the power supply stop command $C_p$ to the power supply stop unit 10o.

If the motor power source suppliable power $P_m$ is larger than the retract operation power $P_{sr1}$, and the control power source suppliable power $P_c$ is smaller than the first motor control device drive power $P_{mc1}$ when the upper control device 17' receives the power failure detection signal $S_s$, the upper control device 17' outputs the sampling period increase command $C_s$ to the current value sampling unit 10a, the motor sampling unit 10b, and the driven object sampling unit 10c, respectively.

If the motor power source suppliable power $P_m$ is equal to or less than the retract operation power $P_{sr1}$ and at the same time, is larger than the stop operation power $P_{sr2}$, the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the first motor control device drive power $P_{mc1}'$ when the upper control device 17' receives the power failure detection signal $S_s$, the upper control device 17' also outputs the sampling period increase command $C_s$ to the current value sampling unit 10a, the motor sampling unit 10b, and the driven object sampling unit 10c, respectively.

If the motor power source suppliable power $P_m$ is control power source suppliable power $P_c$ is smaller than the second motor control device drive power $P_{mc2}'$ when the upper control device 17' receives the power failure detection signal $S_s$, the upper control device 17' outputs the carrier frequency increase command $C_g$ to the PWM signal generation unit 10n.

If the motor power source suppliable power $P_m$ is equal to or less than the retract operation power $P_{sr1}$ and at the same time, is larger than the stop operation power $P_{sr2}$, the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the second motor control device drive power $P_{mc2}'$ when the upper control device 17' receives the power failure detection signal $S_s$, the upper control device 17' also outputs the carrier frequency increase command $C_g$ to the PWM signal generation unit 10n.

If the motor power source suppliable power $P_m$ is larger than the retract operation power $P_{sr1}$, and the control power source suppliable power $P_c$ is smaller than the third motor control device drive power $P_{mc3}'$ when the upper control device 17' receives the power failure detection signal $S_s$, the upper control device 17' outputs the operation stop command $C_o$ to the operation stop unit 10p.

If the motor power source suppliable power $P_m$ is equal to or less than the retract operation power $P_{sr1}$ and at the same time, is larger than the stop operation power $P_{sr2}$, the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the third motor control device drive power $P_{mc3}'$ when the upper control device 17' receives the power failure detection signal $S_s$, the upper control device 17' also outputs the operation stop command $C_o$ to the operation stop unit 10p.

Figure 5:
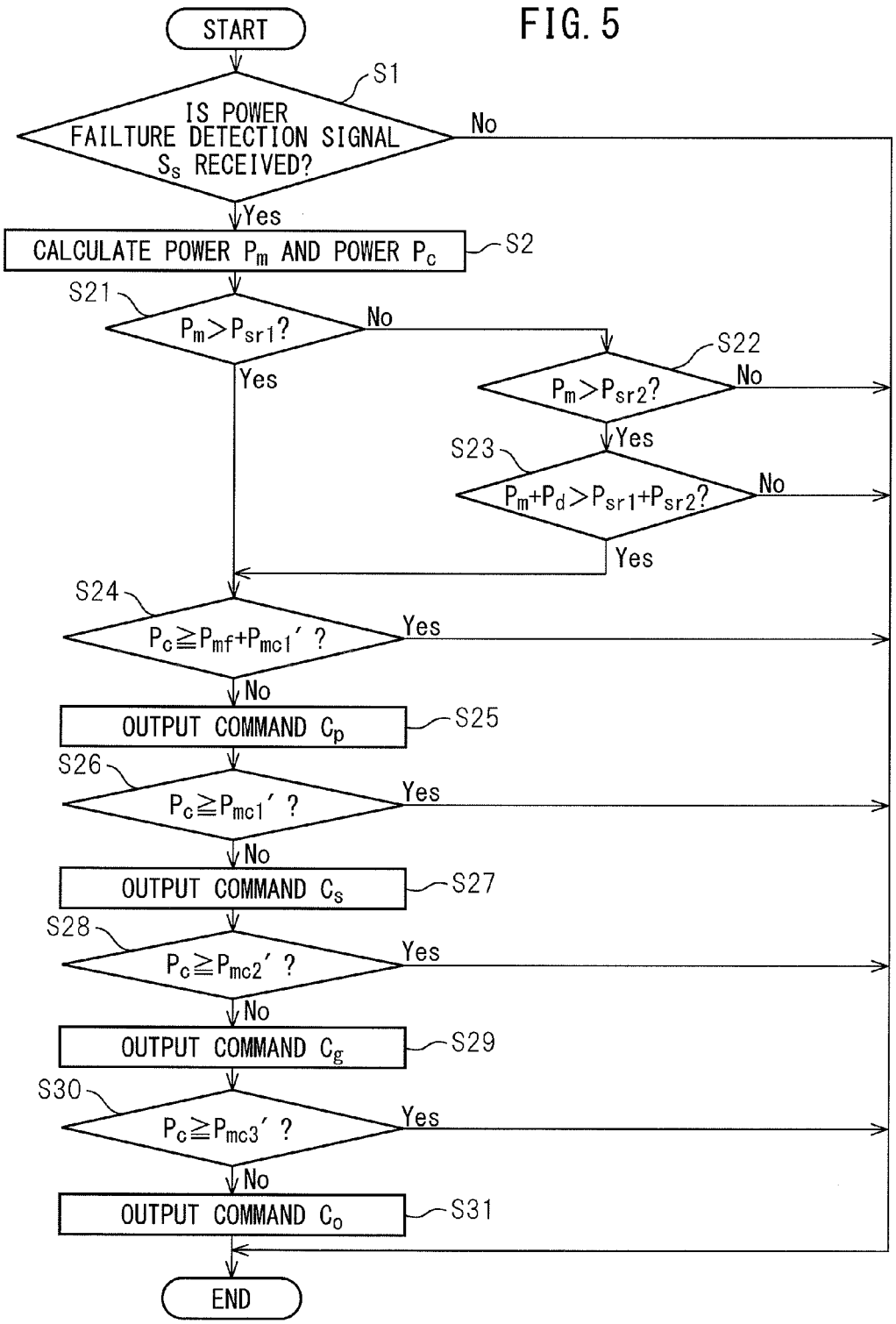
FIG. 5 is a flowchart of an operation of an upper control device in FIG. 4.

FIG. 5 is a flowchart of the operation of the upper control device in FIG. 4, which is performed at each control period (for example, 250 microseconds) during the period from the start of the drive of the motor 5 or the detection of the power failure of the three-phase alternating-current power source 1, and is controlled by processing programs executed in the upper control device 17'.

A case is explained where the motor 5 is driven in order to retract the driven objects 6 and 6' and at the same time, the motor 5' is stopped.

In the flowchart in FIG. 5, after step S2 is completed, the upper control device 17' determines whether or not the motor power source suppliable power $P_m$ is larger than the retract operation power $P_{sr1}$ (step S21). If the motor power source suppliable power $P_m$ is equal to or less than the retract operation power $P_{sr1}$, the upper control device 17' determines whether or not the motor power source suppliable power $P_m$ is larger than the stop operation power $P_{sr2}$ (step S22).

If the motor power source suppliable power $P_m$ is equal to or less than the stop operation power $P_{sr2}$, the processing flow is exited. In contrast, if the motor power source suppliable power $P_m$ is larger than the stop operation power $P_{sr2}$, the upper control device 17' determines whether or not the sum of the motor power source suppliable power $P_m$ and the reduction energy $P_d$ is larger than the sum of the retract operation power $P_{sr1}$ and the stop operation power $P_{sr2}$ P (step S23). If the sum of the motor power source suppliable power $P_m$ and the reduction energy $P_d$ is equal to or less than the sum of the retract operation power $P_{sr1}$ and the stop operation power $P_{sr2}$, the processing flow is exited.

If it is determined that the motor power source suppliable power $P_m$ is larger than the retract operation power $P_{sr1}$ in step S21, or if it is determined that the sum of the motor power source suppliable power $P_m$ and the reduction energy $P_d$ is larger than the sum of the retract operation power $P_{sr1}$ and the stop operation power $P_{sr2}$ in step S23, the upper control device 17' determines whether or not the control power source suppliable power $P_c$ is equal to or more than the sum of the peripheral drive power $P_{mf}$ and the first motor control device drive power $P_{mc1}'$ (step S24).

If the control power source suppliable power $P_c$ is equal to or more than the sum of the peripheral drive power $P_{mf}$ and the first motor control device drive power $P_{mc1}'$, the processing flow is exited. In contrast, if the control power source suppliable power $P_c$ is smaller than the sum of the peripheral drive power $P_{mf}$ and the first motor control device drive power $P_{mc1}$, the upper control device 17' outputs the power supply stop command $C_p$ to the power supply stop unit 10o (step S25).

After step S25 is completed, the upper control device 17' determines whether or not the control power source suppliable power $P_c$ is equal to or more than the first motor control device drive power $P_{mc1}'$ (step S26). If the control power source suppliable power $P_c$ is equal to or more than the first motor control device drive power $P_{mc1}'$, the processing flow is exited. In contrast, if the control power source suppliable power $P_c$ is smaller than the first motor control device drive power $P_{mc1}'$, the upper control device 17' outputs the sampling period increase command $C_s$ to the current value sampling unit 10a, the motor sampling unit 10b, and the driven object sampling unit 10c, respectively (step S27).

After step S27 is completed, the upper control device 17' determines whether or not the control power source suppliable power $P_c$ is equal to or more than the second motor control device drive power $P_{mc2}'$ (step S28). If the control power source suppliable power $P_c$ is equal to or more than the second motor control device drive power $P_{mc2}'$, the processing flow is exited. In contrast, if the control power source suppliable power $P_c$ is smaller than the second motor control device drive power $P_{mc2}'$, the upper control device 17' outputs the carrier frequency increase command $C_g$ to the PWM signal generation unit 10n (step S29).

After step S29 is completed, the upper control device 17' determines whether or not the control power source suppliable power $P_c$ is equal to or more than the third motor control device drive power $P_{mc3}'$ (step S30). If the control power source suppliable power $P_c$ is equal to or more than the third motor control device drive power $P_{mc3}'$, the processing flow is exited. In contrast, if the control power source suppliable power $P_c$ is smaller than the third motor control device drive power $P_{mc3}'$, the upper control device 17' outputs the operation stop command $C_o$ to the operation stop unit 10p (step S31), and exits the processing flow.

If the motor power source suppliable power $P_m$ is larger than the sum of the retract operation power $P_{sr1}$ and the stop operation power $P_{sr2}$, the motor control device 10' carries out control of the motor 5' in order to stop the motor 5' when the processing flow in FIG. 5 of the upper control device 17' is exited, and after the motor 5' stops, the motor control device 10 carries out control of the motor 5 in order to retract the driven object 6 to a region where the driven object 6 does not interfere with an object.

In contrast, in the case where the motor 5 is a gravity axis servo motor and the motor 5' is a main axis motor, and if the motor power source suppliable power $P_m$ is equal to or less than the sum of the retract operation power $P_{sr1}$ and the stop operation power $P_{sr2}$, the motor control device 10 carries out control of the motor 5 in order to retract the driven object 6 to a region where the driven object 6 does not interfere with an object when the processing flow in FIG. 5 of the upper control device 17' is exited or after the motor 5' is stopped by the motor control device 10'. That is, in the case where it is necessary to retract the driven object 6 with priority over stopping the motor 5', the control of the motor 5 in order to retract the driven object 6 is carried out when the processing flow in FIG. 5 of the upper control device 17' is exited, and in contrast, in the case where it is necessary to stop the motor 5' with priority over retracting the driven object 6, the control of the motor 5 in order to retract the driven object 6 is carried out after the motor 5' is stopped by the motor control device 10'.

In the system shown in FIG. 4, if the motor power source suppliable power $P_m$ is equal to or less than the retract operation power $P_{sr1}$ and at the same time, is larger than the stop operation power $P_{sr2}$ the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the sum of the peripheral drive power $P_{mf}$ and the first motor control device drive power $P_{mc1}'$ when the three-phase alternating-current power source 1 fails, the supply of power from the control power source 11 to the monitor 12 and the cooling fan 13 is stopped, and therefore, it is possible to decrease the power consumed by the motor control device 10. Consequently, even if the motor power source suppliable power $P_m$ is equal to or less than the retract power $P_{sr1}$, it is possible to lengthen the output hold time of the control power source 11 without increasing the capacitance of the smoothing capacitor 11b to make it possible to perform the retract operation.

Further, if the motor power source suppliable power $P_m$ is equal to or less than the retract operation power $P_{sr1}$ and at the same time, is larger than the stop operation power $P_{sr2}$, the sum of the motor power source suppliable power $P_m$ and the reduction energy $P_d$ is larger than the sum of the retract operation power $P_{sr1}$ and the stop operation power $P_{sr2}$, and the control power source suppliable power $P_c$ is smaller than the first motor control device drive power $P_{mc1}'$, the second motor control device drive power $P_{mc2}'$ or the third motor control device drive power $P_{mc3}'$ when the three-phase alternating-current power source 1 fails, it is possible to further decrease the power consumed by the motor control device 10 by increasing the sampling period of the current value sampling unit 10a, the motor sampling unit 10b and the driven object sampling unit 10c, by increasing both the sampling period of the current value sampling unit, the motor sampling unit 10b and the driven object sampling unit 10c and the carrier frequency of the PWM signal $V_{PWM}'$ or by stopping the operation of the driven object sampling unit 10c.

The present invention is not limited to the above-mentioned embodiments and can be modified and altered in a variety of ways. For example, it is possible to use the motor control device according to the present invention in a machine other than the machine tool, in which it is necessary to carry out a synchronized operation of a work and a tool therein at all times.

Further, it is also possible to apply the motor control device according to the present invention to a case where full-closed control is not carried out, and any one of the component, which consists of the rotation angle detection unit 7, the motor sampling unit 10b, the subtracter 10d, the filter 10e and the adder 10f and the component, which consists of the rotation angle detection unit 8, the driven object sampling unit 10c, the subtracter 10d, the filter 10e and the adder 10f, can be omitted.

Further, in the above-mentioned embodiments, the three-phase alternating-current power source 1 is used as an alternating-current power source, however, it is also possible to use a multi-phase alternating-current power source other than the three-phase alternating-current power source. It is also possible to apply the motor control device according to the present invention to a system in which power source regeneration is performed. In this case, reactors are arranged between the three-phase alternating-current power source 1 and the current detection units 1u, 1v, and 1w and the converter 2 is made to consist of a plurality of rectifier diodes and transistors in the same number as that of the rectifier diodes.

Further, it is possible to make the rotation angle detection units 7 and 8 consist of a part (for example, hole element or resolver) other than the rotary encoder. It is also possible to provide the motor sampling unit 10b and the driven object sampling unit 10c outside the motor control device 10. Further, it is also possible to omit the rotation angle detection unit 7 and to calculate the rotation angle $\theta_1$ and the rotation speed $\omega_1$ based on the alternating current and the alternating-current voltage supplied to the motor 5.

Further, the case where the monitor 12 and the cooling fan 13 are used as peripherals is explained, however, it is also possible to use any one of the monitor 12 and the cooling fan 13 or to use a peripheral other than the monitor 12 and the cooling fan 13.

Further, the case where the rotation angles $\theta_1$ and $\theta_2$ are sampled is explained, however, it is also possible to sample the rotation speeds $\omega_1$ and $\omega_2$ as the speed of the motor 5 and the speed of the driven object 6 in place of the rotation angles $\theta_1$ and $\theta_2$ as the position of the motor 5 and the position of the driven object 6.

Further, explanation is given on the assumption that the memory 9 is a part of the processor, however, it is also possible to configure the memory 9 as a part other than a processor. It is also possible to provide the memory 9 within the q-axis current command value creation unit 10g or within the d-axis current command value creation unit 10h.

Further, the case where the power failure detection unit 16 detects the current of the three-phase alternating-current power source 1 and compares the level of the output signal corresponding to the detected current and the reference level is explained, however, it is also possible for the power failure detection unit 16 to detect the voltage of the three-phase alternating-current power source 1 and to compare the level of the output signal corresponding to the detected voltage with the reference level.

Further, the case where the power failure detection unit 16 outputs the power failure detection signal $S_s$ to the upper control devices 17 and 17' is explained, however, it is also possible for the power failure detection unit 16 to output the power failure detection signal $S_s$ to the q-axis current command value creation unit 10g and to the d-axis current command value creation unit 10h and for the q-axis current command value creation unit 10g and the d-axis current command value creation unit 10h to determine whether or not the power failure of the three-phase alternating-current power source 1 is detected.

Further, the case where the sampling period (control period of the motor control device 10) of the current value sampling unit 10a, the motor sampling unit 10b and the driven object sampling unit 10c is doubled is explained, however, it is also possible to increase the sampling period to an arbitrary integer (three or more) multiple by performing sampling processing each time a clock signal output from a clock (not shown schematically) incorporated in the motor control device 10 is received an arbitrary number (three or more) of times. Further, it is also possible to provide a clock control unit configured to increase the frequency of the clock signal output from a clock (not shown schematically) incorporated in the motor control unit 10 to each unit of the motor control device 10 within the motor control device 10 in order to increase the sampling period.

Further, the case where the carrier frequency of the PWM signal $V_{PWM}$ is doubled is explained, however, it is also possible to increase the carrier frequency of the PWM signal $V_{PWM}$ to an arbitrary integer (three or more) multiple by setting a carrier frequency corresponding to an arbitrary number (three or more) of periods of a timer (not shown schematically) incorporated in the motor control device 10. Further, it is also possible to provide a timer control unit configured to increase the count value of a timer (not shown schematically) incorporated in the motor control device 10 within the motor control device 10 in order to increase the carrier frequency of the PWM signal $V_{PWM}$.

Further, the case where processing to increase the sampling period of the current value sampling unit 10a, the motor sampling unit 10b and the driven object sampling unit 10c, processing to increase the carrier frequency of the PWM signal $V_{PWM}$, and processing to stop the operation of the driven object sampling unit 10c are performed sequentially in order to decrease the power consumed by the motor control device 10, is explained, however, it is possible to stop the operation of the driven object sampling unit 10c before increasing the sampling period. Instead of performing all of the processing to increase the sampling period, the processing to increase the carrier frequency, and the processing to stop the operation of the driven object sampling unit 10c, it is also possible to perform only the processing to increase the sampling period, or to perform both the processing to increase the sampling period and the processing to increase the carrier frequency, or to perform only the processing to stop the operation of the driven object sampling unit 10c, or to perform both the processing to increase the sampling period and the processing to stop the operation of the driven object sampling unit 10c.

Further, the case where the upper control devices 17 and 17' detect the voltage (DC link voltage) $V_{c1}$ of the smoothing capacitor 3 and the voltage $V_{c2}$ of the smoothing capacitor 11b and calculate the motor power source suppliable power $P_m$ and the control power source suppliable power $P_c$, is explained, however, it is also possible to provide a first voltage detection unit configured to detect the voltage (DC link voltage) $V_{c1}$ of the smoothing capacitor 3, a second voltage detection unit configured to detect the voltage $V_{c2}$ of the smoothing capacitor 11b, and a calculation unit configured to calculate the motor power source suppliable power $P_m$ and the control power source suppliable power $P_c$ in the motor control device 10.

Further, the case where the motor drive power $P_{sr}$, the peripheral drive power $P_{mf}$, and the first motor control device drive power $P_{mc1}$, the second motor control device drive power $P_{mc2}$ and the third motor control device drive power $P_{mc3}$ are stored in association with the rotation speed command value $\omega_{com}$ in the memory (not shown schematically) of the upper control devices 17 and 17' in advance, is explained, however, it is also possible to provide a storage unit, which stores the motor drive power $P_{sr}$, the peripheral drive power $P_{mf}$, and the first motor control device drive power $P_{mc1}$, the second motor control device drive power $P_{mc2}$ and the third motor control device drive power $P_{mc3}$ in association with the rotation speed command value $\omega_{com}$, in the motor control device 10.

Furthermore, it is also possible to stop the operation of the motor sampling unit 10b instead of stopping the operation of the driven object sampling unit 10c in order to decrease the power consumed by the motor control device 10.

As above, the present invention is explained in relation to the preferred embodiments thereof, however, it should be understood by a person skilled in the art that various alterations and modifications can be made without deviating from the scope disclosed by the claims.

The invention claimed is:

1. A motor control device to which power is supplied from a control power source configured to supply power to a peripheral of a motor in order to control the motor driven by power stored in a DC link part connected to an alternating-current power source via a converter, the motor control device comprising:
    a current value sampling unit configured to sample a current value of the motor;
    a PWM signal generation unit configured to generate a PWM signal to drive the motor, based on the sampled current value of the motor; and
    a power supply stop unit configured to stop supply of power from the control power source to the peripheral depending on the power stored in the DC link part and power to which the control power source can supply when the alternating-current power source fails,
    wherein the power supply stop unit stops the supply of power from the control power supply to the peripheral if the power stored in the DC link part is larger than any one of first power necessary to retract an driven object connected to the motor to a region where the driven object does not interfere with an object, second power necessary to stop the motor in order to avoid interference of the driven object connected to the motor with the object, and the sum of the first power and the second power, and the power to which the control power source can supply is smaller than the sum of power necessary to drive the peripheral and power necessary to drive the motor control device when the alternating-current power source fails.

2. The motor control device according to claim 1, wherein the current value sampling unit increases a sampling period of the current value of the motor if the power stored in the DC link part is larger than any one of the first power, the second power, and the sum of the first power and the second power, and the power to which the control power source can supply is smaller than the power necessary to drive the motor control device when the alternating-current power source fails.

3. The motor control device according to claim 2, wherein the PWM signal generation unit decreases a carrier frequency of the PWM signal if the power stored in the DC link part is larger than any one of the first power, the second power, and the sum of the first power and the second power, and the power to which the control power source can supply is smaller than the power necessary to drive the motor control device when the alternating-current power source fails.

4. The motor control device according to claim 1, further comprising:
- a motor sampling unit configured to sample the position or speed of the motor;
- a driven object sampling unit configured to sample the position or speed of the driven object connected to the motor; and
- an operation stop unit configured to stop the operation of any one of the motor sampling unit and the driven object sampling unit if the power stored in the DC link part is larger than any one of the first power, the second power, and the sum of the first power and the second power, and the power to which the control power source can supply is smaller than the power necessary to drive the motor control device when the alternating-current power source fails.

5. A motor control device to which power is supplied from a control power source configured to supply power to a peripheral of a motor in order to control the motor driven by power stored in a DC link part connected to an alternating-current power source via a converter, the motor control device comprising:
- a current value sampling unit configured to sample a current value of the motor;
- a PWM signal generation unit configured to generate a PWM signal to drive the motor, based on the sampled current value of the motor; and
- a power supply stop unit configured to stop supply of power from the control power source to the peripheral depending on the power stored in the DC link part and power to which the control power source can supply when the alternating-current power source fails,
- wherein the power supply stop unit stops the supply of power from the control power source to the peripheral if the power stored in the DC link part is equal to or less than first power necessary to retract the driven object connected to the motor to a region where the driven object does not interfere with the object and at the same time, is larger than second power necessary to stop another motor in order to avoid interference of a driven object connected to the other motor connected in parallel to the motor controlled by the motor control device with an object, the sum of the power stored in the DC link part and reduction energy stored in the DC link part while the other motor is coming to a stop is larger than the sum of the first power and the second power, and the power to which the control power source can supply is smaller than the sum of the power necessary to drive the peripheral and the power necessary to drive the motor control device and the motor control device of the other motor when the alternating-current power source fails.

6. The motor control device according to claim 5, wherein the current value sampling unit increases the sampling period of the current value of the motor if the power stored in the DC link part is equal to or less than the first power and at the same time, is larger than the second power, the sum of the power stored in the DC link part and the reduction energy generated while another motor is coming to a stop is larger than the sum of the first power and the second power, and the power to which the control power source can supply is smaller than the power necessary to drive the motor control device and the motor control device of the other motor when the alternating-current power source fails.

7. The motor control device according to claim 6, wherein the PWM signal generation unit decreases the carrier frequency of the PWM signal if the power stored in the DC link part is equal to or less than the first power and at the same time, is larger than the second power, the sum of the power stored in the DC link part and the reduction energy generated while another motor is coming to a stop is larger than the sum of the first power and the second power, and the power that the control power source can supply is smaller than the power necessary to drive the motor control device and the motor control device of the other motor when the alternating-current power source fails.

8. The motor control device according to claim 5, further comprising:
- a motor sampling unit configured to sample the position or speed of the motor;
- a driven object sampling unit configured to sample the position or speed of the driven object connected to the motor; and
- an operation stop unit configured to stop the operation of any one of the motor sampling unit and the driven object sampling unit if the power stored in the DC link part is equal to or less than the first power and at the same time, is larger than the second power, the sum of the power stored in the DC link part and the reduction energy generated while another motor is coming to a stop is larger than the sum of the first power and the second power, and the power to which the control power source can supply is smaller than the power necessary to drive the motor control device and the motor control device of the other motor when the alternating-current power source fails.

* * * * *